United States Patent
Lundstrom et al.

(10) Patent No.: US 10,756,570 B2
(45) Date of Patent: Aug. 25, 2020

(54) COORDINATED NET-LOAD MANAGEMENT

(71) Applicants: Alliance for Sustainable Energy, LLC, Golden, CO (US); Regents of the University of Minnesota, Minneapolis, MN (US)

(72) Inventors: Blake Richard Lundstrom, Lakewood, CO (US); Sourav Kumar Patel, Minneapolis, MN (US); Murti Salapaka, Plymouth, MN (US)

(73) Assignees: Alliance for Sustainable Energy, LLC, Golden, CO (US); Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 16/298,912

(22) Filed: Mar. 11, 2019

(65) Prior Publication Data

US 2019/0280521 A1    Sep. 12, 2019

Related U.S. Application Data

(60) Provisional application No. 62/640,876, filed on Mar. 9, 2018.

(51) Int. Cl.
*H02J 13/00* (2006.01)
*H02J 3/12* (2006.01)

(52) U.S. Cl.
CPC .......... *H02J 13/0017* (2013.01); *H02J 3/12* (2013.01)

(58) Field of Classification Search
CPC ............... H02J 13/0006; H02J 13/0017; H02J 13/0062; H02J 13/0075; H02J 13/0079;
(Continued)

(56) References Cited

U.S. PATENT DOCUMENTS

| | | | |
|---|---|---|---|
| 2006/0276938 A1* | 12/2006 | Miller | H02J 3/00 700/295 |
| 2013/0085616 A1* | 4/2013 | Wenzel | H02J 3/14 700/278 |
| 2014/0200723 A1* | 7/2014 | Roy | G06Q 50/06 700/291 |

OTHER PUBLICATIONS

Kondoh et al., Consumed Power Control of Time Deferrable Loadsfor Frequency Regulation, 2004, National Institute of Advanced Industrial Science and Technology (AIST), Tsukuba, Ibaraki 305-8568, Japan, p. 1-5. (Year: 2004) (Year: 2004).*

(Continued)

*Primary Examiner* — Kidest Bahta
(74) *Attorney, Agent, or Firm* — Robert G. Pittelkow

(57) ABSTRACT

A management device includes at least one processor communicatively coupled to at least one energy resource controller controlling at least one energy resource and to at least one deferrable load controller controlling power to at least one deferrable load. The is configured to receive an indication, determined based on a frequency value of an electrical network and a nominal frequency value, that a frequency anomaly event has occurred. Responsive to receiving the indication that the frequency anomaly event has occurred, the processor is also configured to determine, for at least one of the energy resource and the deferrable load, based on the frequency value, the nominal frequency value, and a power value of the electrical network, a respective power command, and cause at least one of the at least one energy resource and the at least one deferrable load to modify operation based on the respective power command.

20 Claims, 4 Drawing Sheets

(58) Field of Classification Search
CPC ........ H02J 3/12; H02J 3/14; H02J 3/24; H02J 3/32; H02J 3/382
See application file for complete search history.

(56) References Cited

OTHER PUBLICATIONS

Lundstrom et al., Fast Primary Frequency Response using Coordinated DER and Flexible Loads: Fram workand Residential-scale Demonstration, Jul. 2018 , National Renewable Energy Laboratory, University of Minnesota , 1-5. (Year: 2018) (Year: 2014).*
Gan et al., Real-Time Deferrable Load Control: Handling the Uncertainties of Renewable Generation, May 21-24, 2013, California Inst. of Tech, pp. 113-124. (Year: 2013) (Year: 2013).*
Arai et al., "Demonstration Test of Frequency Regulation by Autonolous Load Control", 19th International Conference on Electrical Machines and Systems (ICEMS), 2016, pp. 1-4.
Chen et al., "A Distributed Direct Load Control Approach for Large-Scale Residential Demand Response", IEEE Transactions on Power Systems, Sep. 2014, vol. 29, No. 5, pp. 2219-2228.
Hammerstrom et al., "Pacific Northwest GridWise™ Testbed Demonstration Projects; Part II. Grid Friendly™ Appliance Project", Pacific Northwest National Laboratory PNNL-17079, Oct. 2007, pp. 1-123.
Hu et al., "Improving Frequency Stability Based on Distributed Control of Multiple Load Aggregators", IEEE Transactions on Smart Grid, Jul. 2017, vol. 8, No. 4, pp. 1553-1567.
Lin et al., "Experimental Evaluation of Frequency Regulation From Commercial Building HVAC Systems", IEEE Transactions on Smart Grid, Mar. 2015, vol. 6, No. 2, pp. 776-783.
Lundstrom et al., "Fast Primary Frequency Response Using Coordinated DER and Flexible Loads: Framework and Residential Scale Demonstration", Pre-print to be presented at the 2018 IEEE Power and Energy Society General Meeting, Aug. 2018, pp. 1-5.
Milligan et al., "Operating Reserves and Wind Power Integration: An International Comparison", 9th Annual International Workshop on Large-Scale Integration of Wind Power into Power Systems as well as on Transmission Networks for Offshore Wind Power Plants Conference, Preprint—NREL/CP-5500-49019, Oct. 2010, pp. 1-16.
Vrettos et al., "Experimental Demonstration of Frequency Regulation by Commercial Buildings—Part II: Results and Performance Evaluation", IEEE Transactions on SmartGrid, 2016, vol. 9, No. 4, pp. 1-11.
Xu et al., "Stable Multi-Agent-Based Load Shedding Algorithm for Power Systems", IEEE Transactions on Power Systems, Nov. 2011, vol. 26, No. 4, pp. 2006-2014.
Zhao et al., "Optimal Load Control via Frequency Measurement and Neighborhood Area Communication", IEEE Transactions on Power Systems, Nov. 2013, vol. 28, No. 4, pp. 3576-3587.

* cited by examiner

COORDINATED NET-LOAD MANAGEMENT

CROSS-REFERENCE TO RELATED APPLICATIONS

This application claims the benefit of U.S. Provisional Application No. 62/640,876, filed Mar. 9, 2018, the entire content of which is incorporated herein by reference.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

This invention was made with Government support under contract number DE-AR0000701 awarded by DOE, Office of ARPA-E. The Government has certain rights in this invention.

BACKGROUND

Power systems typically include multiple, distinct frequency control levels. Primary frequency control is typically implemented locally at each generator and works autonomously, usually within one to three seconds after a disturbance. Droop controllers, which adjust speed or output of the generator, are one example of primary frequency control. Secondary frequency control includes Automatic Generation Control (AGC), in which a central controller adjusts the active power output of multiple generators in an area to restore the frequency and power interchanges with other control areas to their target values. Secondary frequency control typically occurs within four seconds to five minutes after a disturbance. Tertiary frequency control response typically takes minutes to hours and is used to address non-urgent events and longer-lasting effects or for other reasons.

The integration of renewable generation and distributed energy resources (DERs) into the electric system continues at a fast pace and is posed to be a permanent trend. These resources are typically coupled to the grid using power electronics rather than rotating generators. The reality of more inverter-coupled generation, in addition to related trends, is resulting in decreased system inertia and posing challenges toward stabilizing grid voltage and frequency.

SUMMARY

In one example, a device includes at least one processor communicatively coupled to at least one energy resource controller that controls at least one energy resource and to at least one deferrable load controller that controls power to at least one deferrable load. The at least one processor is configured to receive an indication, determined based on a frequency value of an electrical network and a nominal frequency value, that a frequency anomaly event has occurred. The at least one processor is also configured to, responsive to receiving the indication that the frequency anomaly event has occurred, determine, for at least one of the at least one energy resource and the at least one deferrable load, based on the frequency value, the nominal frequency value, and a power value of the electrical network, a respective power command, and cause at least one of the at least one energy resource and the at least one deferrable load to modify operation based on the respective power commands.

In another example, A system includes a grid point of common coupling (PCC) controller configured to measure a frequency value of an electrical distribution network at a point at which the electrical distribution network connects to a consumer electrical system, determine, based on the frequency value and a nominal frequency value, whether a frequency anomaly event has occurred, and responsive to determining that the frequency anomaly event has occurred, output an indication of the frequency anomaly event. The system also includes a net-load management device comprising at least one processor, wherein the net-load management device is configured to receive the indication of the frequency anomaly event, output a request for a respective present operating power value for at least one deferrable load in the consumer electrical system, and receive an indication of the respective present operating value for the at least one deferrable load. The net-load management device is further configured to, responsive to receiving the indication of the frequency anomaly event, determine, for the at least one deferrable load, based on the respective present operating value, the frequency value, and a nominal frequency value, a respective power command, and output an indication of the respective power command. The system further includes at least one deferrable load controller operatively coupled to the at least one deferrable load. The at least one deferrable load controller is configured to receive the indication of the respective power command and cause the at least one deferrable load to modify operation based on the respective power command.

In another example, a method includes receiving, by a computing device comprising at least one processor, an indication, determined based on a frequency value of an electrical network and a nominal frequency value, that a frequency anomaly event has occurred. The computing device is communicatively coupled to at least one energy resource controller that controls at least one energy resource and to at least one deferrable load controller that controls power to at least one deferrable load. The method further includes, responsive to receiving the indication that the frequency anomaly event has occurred: determining, by the computing device and for at least one of the at least one energy resource and the at least one deferrable load, based on the frequency value, the nominal frequency value, and a power value of the electrical network, a respective power command, and causing, by the computing device, at least one of the at least one energy resource and the at least one deferrable load to modify operation based on the respective power command.

The details of one or more examples are set forth in the accompanying drawings and the description below. Other features, objects, and advantages will be apparent from the description and drawings, and from the claims.

DETAILED DESCRIPTION

The techniques of the present disclosure provide primary frequency response using flexible load and DERs. Specifically, the systems, devices, and/or methods described herein may be used to coordinate a group of flexible loads and controllable DERs in real time or near-real time to provide fast (e.g., within about 10 AC cycles or within about 200 ms) frequency reserves that can serve as a step response for primary frequency control. As one example, a management device (also referred to herein as a load controller unit) may be installed in a residential or commercial building and be operatively connected to one or more DERs and one or more loads. The management device may be configured to monitor the grid for frequency events. If an event is detected, the management device may consider various objectives while causing the DERs and/or loads to modify operation in order to provide primary response to the grid. That is, the management device may determine statuses of devices under its control, develop a strategy for providing the primary response based on one or more objectives, and cause the devices under control to implement the strategy all within about 10 AC cycles.

With the increase in inverter-coupled generation and related trends, techniques for stabilization of grid voltage and frequency will need to incorporate increased participation from DERs. With continuing deployment of information and communication infrastructure, flexible and controllable load can become effective resources for grid frequency regulation when aggregated and coordinated together to create virtual power plants as described herein. In contrast to related-art approaches, the techniques of the present disclosure involve individual loads communicating with a centralized master controller that determines an optimal approach for dispatching controllable DERs and deferrable load.

The techniques of the present disclosure leverage high-speed local measurements and ensure that local objectives, which could potentially vary over time, are met. By obtaining accurate or "recent" information to perform frequency response, the techniques described herein may greatly reduces the uncertainty of the outcome and avoids the need for forecasting. That is, by quickly determining and implementing a solution, it is less likely that the situation has already changed. These techniques also offer coordination and optimal control advantages on a fast timescale that is suited for primary frequency control. The techniques herein may be used at a building or plant scale, where flexibility across multiple building net-load devices can be leveraged, but are also well suited for inclusion in hierarchical or aggregated schemes. For instance, master controllers may control multiple (e.g., 5, 10, or other number) homes or buildings, and distributed or centralized control of such groupings may hierarchically leverage hundreds or even thousands of homes or buildings.

Figure 1:
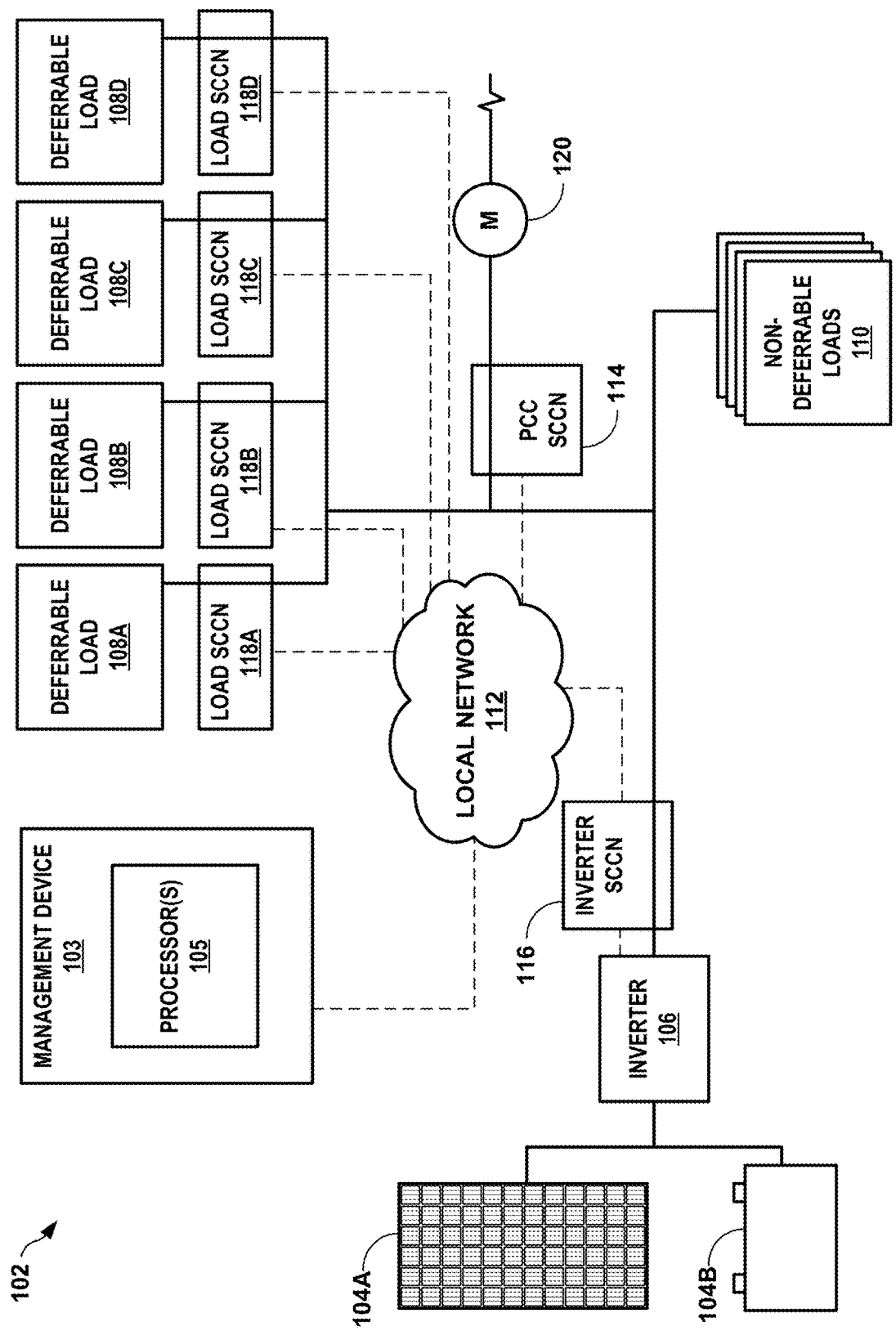
FIG. 1 is a conceptual diagram illustrating an example consumer electrical system using coordinated net-load management, in accordance with one or more aspects of the present disclosure.

FIG. 1 is a conceptual diagram illustrating an example consumer electrical system (e.g., system 102) using coordinated net-load management, in accordance with one or more aspects of the present disclosure. In the example of FIG. 1, system 102 includes management device 103, energy resources 104A and 104B (collectively "energy resources 104"), inverter 106, deferrable loads 108A-108D (collectively "deferrable loads 108"), non-deferrable loads 110, and local network 112. Inverter 106, deferrable loads 108, and non-deferrable loads 110 may all be connected on a common electrical bus. System 102 also includes PCC SCCN 114, inverter SCCN 116, load SCCNs 118A-118D (collectively "load SCCNs 118"), and utility meter 120. System 102 represents only one example of an electrical system using coordinated net-load management, and the techniques described herein may be used in various other systems having more, fewer, or different components than those shown in the example of FIG. 1.

Management device 103, in the example of FIG. 1, represents a computing device configured to implement the coordinated net-load management techniques detailed herein. In some examples, management device 103 may be a computer, such as a desktop computer, a laptop computer, a server computer, or other computer. In some examples, management device 103 may be a computing device that is custom designed to perform the techniques of the present disclosure.

In the example of FIG. 1, management device 103 includes one or more processors 105. Processors 105 may implement functionality and/or execute instructions within management device 103. For example, processors 105 may receive and execute instructions, thereby enabling the functionality of management device 103. In some examples, processors 105 may represent an application specific integrated circuit (ASIC) or field programmable gate array (FPGA) that was designed and/or configured to perform the net-load management techniques described herein.

In the example of FIG. 1, energy resources 104 each represent a device or system capable of generating electrical power that can be fed (e.g., via an inverter or other device, in some examples) into an electrical network. In the example of FIG. 1, for instance, energy resource 104A is shown as a PV array and energy resource 104B is shown as a battery or energy storage system. Other examples of energy resources include wind turbines, generators (e.g., gas generators, etc.), fuel cells, electric vehicles, and others. Though not shown in the example of FIG. 1 for brevity, energy resources 104 may include independent, intermediate power electronic converters (e.g., a DC-DC converter to enable maximum energy extraction from the solar array via maximum power point tracking) between their outputs and the input to inverter 106.

Inverter 106, in the example of FIG. 1, represents power electronics configured to manage the power output of one or more energy resources. For instance, inverter 106 may receive power from energy resources 8A and 8B and transform the power into a form that can be transmitted via the connected electrical system. Power inverters, in general, may perform various operations to modulate the amount of power being transferred and make the power output of energy resources more stable and/or more compatible with power networks. In some examples, inverters such as inverter 106 may output both active and reactive power. For simplicity, the techniques described herein are explained with a focus on active power. Reactive power, however, may be important for other system functions like regulating the voltage throughout a distribution network to stay within safe levels.

In the example of FIG. 1, deferrable loads 108 and non-deferrable loads 110 represent any number of common power consumption devices. Common residential examples of deferrable loads 108 and/or non-deferrable loads 110 may be a refrigerator, an oven, lights, a plug-in space heater, a microwave, a water heater, a dishwasher a washing machine, a dryer, an air conditioner, an electric vehicle charging station, or any other device that consumes power.

Whether a load is a deferrable load or a non-deferrable load may be determined in a number of ways. In some examples, a user or manager of the devices may decide whether a load is deferrable or not. For instance, perhaps a user determines that the fridge, oven, water heater, and space heater are deferrable, because these devices intrinsically contain thermal energy storage and so can be curtailed to some degree without much effect on the user. On the other hand, the user may designate the lights, dishwasher, washing machine, dryer, and air conditioner as non-deferrable loads, because these may be devices the operation of which the user is not willing to compromise on. In some examples, the technical capabilities (e.g., required power quality, necessary communication technology, etc.) of a device may determine whether the device is deferrable or not. For instance, a computer requiring constant, uniform input power and sensitive to interruption at short notice, may not be able to be a deferrable load. In some examples, other means of determining whether loads are deferrable or not may be additionally or alternatively employed.

Deferrable loads, generally, may include controllable loads and non-controllable loads. Controllable loads may be those loads that can be given a continuous value as a load set point command. Non-controllable loads may be those loads with no capability of receiving or acting upon a load set point. Examples of a controllable deferrable load may be an electric vehicle charging station, dimmable lights, a plug-in heater with multiple or fully-variable control settings, or a variable-speed pool pump. Examples of non-controllable deferrable loads may include most legacy devices that cannot be modulated, but only turned "on" or "off." For simplicity, in the example of FIG. 1, all of deferrable loads 108 are non-controllable loads.

Local network 112, in the example of FIG. 1, represents any communication infrastructure sufficient to allow the communication described herein. For example, local network 112 may be a wired or wireless internet protocol (IP) network allowing for ease of integration and scalability. In such example, local network 112 may include network cables, network switches, IP routers, wireless access points, wireless adapters, or any other equipment usable to implement an IP network. As another example, local network 112 may be another type of wired or wireless network, such as serial communications bus or cellular wireless network. Note that local network 112 should not introduce significant latency into the communications between devices, given the primary response nature of the techniques described herein.

In the example of FIG. 1, the point of common coupling (PCC) to the distribution network is interfaced to a control layer (represented by the dashed lines in FIG. 1) via PCC SCCN 114. PCC SCCN 114 represents a flexible Sensing, Communication, and Control Node (SCCN). PCC SCCN 114 may be configured to measure various electrical parameter values (e.g., frequency, voltage, current, or other values) of the power being provided to system 102 from utility meter 120. PCC SCCN 114 may also be configured to transmit such parameter values (e.g., via local network 112) to management device 103 and, in rare circumstances and upon command, disconnect the entirety of system 102 from the local grid connection.

In the example of FIG. 1, inverter 106 is interfaced to the control layer through inverter SCCN 116. Inverter SCCN 116 represents a flexible interface configured to measure various electrical parameter values of the power being provided (or absorbed) by inverter 106 and transmit such parameter values (e.g., via local network 112) to management device 103. Inverter SCCN 116 may also be configured to receive (e.g., via local network 112) dispatch commands from management device 103 and cause inverter 106 to modify operation accordingly. For example, inverter SCCN 116 may receive an active power set point determined by management device 103 and provide the set point to a local controller of inverter 106. Inverter 106 may then modify operation to output the active power specified by the set point_

In the example of FIG. 1, each of deferrable loads 108 is interfaced to the control layer through one of load SCCNs 118. For example, load SCCN 118A corresponds to deferrable load 108A, and so on. Load SCCNs 118 represent flexible interfaces configured to measure various electrical parameter values of the power being absorbed by deferrable loads 108 and transmit such parameter values (e.g., via local network 112) to management device 103. Load SCCNs 118 may also be configured to receive (e.g., via local network 112) dispatch commands from management device 103 and cause the corresponding one of deferrable loads 108 to modify operation accordingly. In some examples, such as when deferrable loads 108 are controllable loads, a load SCCN may cause the load to modify operation by transmitting a power set point to the load. In some examples, such as when deferrable loads 108 are non-controllable loads, a load SCCN itself may control power delivery to the load. That is, for non-controllable loads, a load SCCN may include means (e.g., a switching mechanism) for connecting and disconnecting the non-controllable load, making it dispatchable. As all of deferrable loads 108 are non-controllable loads in the example of FIG. 1, all of load SCCN s 118 may include switches or other mechanisms to cut off power to the respective deferrable loads 108 based on received dispatch commands.

In general, SCCNs may provide the necessary functionality to facilitate the techniques described herein. Depending on the associated device, the SCCN may make or obtain measurements, provide the measurements to the management device, receive dispatch commands from the management device, and act on or pass on the dispatch commands. For instance, in some examples, SCCNs may continuously collect and process (e.g., using filters, frequency calculation, etc.) analog inputs as needed representing voltage and current measurements of the associated device. In some examples, SCCNs may buffer (e.g., store) these measurements so that a recent measurement is always available to be sent back to a management device immediately upon request (i.e., without any delay for a new measurement to be taken). In some examples, SCCNs may, based on these measurements, determine the control capacity that is possible for the associated device, and report this capacity to the management device. The determined control capacity could be used for instance, to implement minimum or maximum run times for a particular appliance to avoid damaging that appliance.

In some examples, SCCNs may organize/package the measurements and commands into a format expected by the management device. SCCNs may, in some examples, handle communications with the management device over a specified protocol. In some examples, SCCNs may receive dispatch commands from the management device, verify the dispatch command is within capability of the associated device, and act on the command and/or pass the command to the associated device.

The functionality of an SCCN depends on the associated device. For instance, an inverter normally has a controller to manage its power output. Thus an inverter SCCN may not need to control the power output of the inverter itself, but rather pass commands to the inverter in a compatible format. Some deferrable loads (e.g., certain "smart" devices) also have such capability. However, these capabilities often lack sufficient speed and/or the ability to provide certain measurements, thus an SCCN may instead act on dispatch commands itself to modify operation of the deferrable load. In such instances, the load may or may not be capable of reduction. Some devices, for instance, may only be able to be turned "on" or "off." In such instance, an SCCN may use a simple switching mechanism to cutoff power to the load. On the other hand, some devices may have multiple power settings or variable power settings. In such instance, an SCCN may use other techniques to adjust the power to the load, such as pulse width modulation (PWM) or other suitable techniques. In the future, SCCNs may be incorporated into one or more devices. For instance, loads (e.g., smart appliances), PCC devices (e.g., smart meters), and/or energy resource devices (e.g., power inverters) may include some combination of hardware, software, and/or firmware that enables the device to perform some or all of the functionality of SCCNs as described herein.

While shown and described herein as each corresponding to a single device, SCCNs may, in other examples, correspond to more than one device. For example, load SCCNs 118 may actually be a single load SCCN to which all four of loads 108 is connected. As another example, inverter SCCN 116 and PCC SCCN 112 may be combined in some examples and the unified SCCN may perform functions of both SCCNs 112 and 116.

In the example of FIG. 1, utility meter 120 represents a metering device connecting a residential, commercial, or other consumer to a power distribution grid (not shown). Utility meter 103 may be a conventional meter, a smart meter, or any other utility meter.

A collection of loads (both deferrable and non-deferrable) and inverter-interfaced energy resources behind a typical electric customer meter is referred to herein as a "net-load" unit. In the example of FIG. 1, for instance, energy resources 104, inverter 106, deferrable loads 108, and non-deferrable loads 110 may represent a net-load unit.

The power imported from the grid (e.g., through utility meter 120) is given by $P_{G,grid}(t)$ and the capacity limits can be defined as $P_{G,grid}^{min} \leq P_{G,grid}(t) \leq P_{G,grid}^{max}$. The power supplied by inverter 106 is defined as $P_{G,inv}(t)$, where $P_{G,inv}(t)>0$ when inverter 106 is supplying power to the AC bus and $P_{G,inv}(t)<0$ when inverter 106 is absorbing power from the AC bus. Inverter 106 should be operated within its ratings $P_{G,inv}^{min} \leq P_{G,inv} \leq P_{G,inv}^{max}$, and could be unidirectional ($P_{G,inv}^{min}=0$) or bidirectional ($P_{G,inv}^{min}<0$). Inverter 106 may switch to a different power set point in response to receiving a dispatch command $P_{G,inv}^*$. Inverter response to a dispatch command $P_{G,inv}^*$ can be very fast. An inverter reference tracking response time of less than two cycles is experimentally shown herein with a custom inverter, though this response time can be slower for other inverters.

Let $P_L(t)=\{P_{L,i}(t)\}_{i=1}^{N_L}$ represent the set of power demands from the $N_L$ non-deferrable loads (e.g., non-deferrable loads 110) and $P_{Ld}(t)=\{P_{Ld,i}(t)\}_{i=1}^{N_{Ld}}$ represent the set of time-varying power demands from the $N_{Ld}$ deferrable loads (e.g., deferrable loads 108). Deferrable loads 108 may be turned on or off responsive to receiving a command $q_{Ld,i}^*(t) \in \{0,1\}$ such that the effective power is $\hat{P}_{Ld,i}(t) = q_{Ld,i}^*(t)P_{Ld,i}(t)$. By Kirchoff's laws, the (ideal) power consumed from the grid is therefore: $P_{G,grid}=\Sigma_i^{N_L}P_{L,i}+\Sigma_i^{N_{Ld}}P_{Ld,i}-P_{G,inv}$. The power consumed or supplied at each point, and deferrable load commands are all assumed to be time-varying quantities. The time dependence (t) is dropped for ease of notation in some cases herein.

Assume that the net-load unit shown in FIG. 1 is incentivized by the local system operator, a local aggregator, or other entity to provide a net-load response upon detection of a frequency anomaly event in the distribution network. Example incentives may include monetary or other benefits to the consumer. A frequency anomaly event may be defined to be when $f(t)<(f_{nom}-\delta_{f,low})$ or $f(t)>(f_{nom}+\delta_{f,high})$, where $f_{nom}$ is the nominal grid frequency and $\delta_{f,low}$ and $\delta_{f,high}$ are nominal frequency limits (in Hz) below and above $f_{nom}$. When frequency outside these limits is detected, the net-load unit may respond such that:

$$P_{grid}^*(t_e+\tau)=(1-\eta \text{sign}(f(t_e)-f_{nom}))P_{G,grid}(t_e) \quad (1)$$

where $t_e$ represents the instant in time in which a frequency anomaly event is detected, $\tau$ is the unit's response time, $\eta \in [0.0,1.0]$ is a parameter defining what percentage of a net-load unit's power output must be curtailed or increased (i.e., a participation factor), $f(t_e)$ is the measured grid AC frequency at $t=t_e$, $P_{G,grid}$ is the measured power transfer at the grid PCC, and $P_{G,grid}^*$ is the grid power command. In practice, $P_{G,grid}^*$ is determined by the $\eta$ agreed upon by the net-load unit operator and the aggregator or system operator.

While a net-load unit operator (e.g., a homeowner) may provide this net-load response in exchange for the received incentive, the operator may desire to do so in a particular fashion or while preventing certain occurrences. These desires represent control objectives. The techniques of the present disclosure are designed to be flexible such that they can incorporate a variety of control objectives. In the example of FIG. 1, for instance, the net-load unit operator may desire to provide the primary response with minimal inconvenience to him- or herself by avoiding the total amount of load that must be curtailed (a likely objective for real-world consumers). Consequently, management device 103 may be configured to implement the example control objective of minimizing the total amount of load that must be deferred while providing the frequency response.

The objective in the example of FIG. 1 thus becomes to provide the desired net-load response by prioritizing the dispatch of inverter 106 and, if the inverter's response cannot satisfy the overall net-load response requirement, curtail the minimum possible amount of deferrable loads 108 to meet the requirement. This objective can be formalized as:

$$\max_{q^*} \sum_{i=1}^{N_{Ld}} c_i \hat{P}_{Ld,i}(t_e+\tau) \quad (2)$$

$$\text{subject to } P_{G,grid}(t_e+\tau) = P_{G,grid}^*(t_e+\tau) \quad (3)$$

$$P_{G,inv}^{min} \leq P_{G,inv}(t) \leq P_{G,inv}^{max} \quad (4)$$

$$P_{G,grid}^{min} \leq P_{G,grid}(t) \leq P_{G,grid}^{max}. \quad (5)$$

where $c_i=1$ $\forall i$. It is important to note, however, that the developed framework is flexible, such that a variety of other user objectives can be achieved in accordance with the techniques described herein. For example, using $c_i=1 \forall i$ in equation (2) makes the cost associated with each individual ($i=1 \ldots N_{Ld}$) load decision equal to the capacity of the load, thus resulting in an optimal solution that minimizes the total amount of load that must be curtailed. However, if the user instead wished to prioritize some loads over others in a particular order, the $c_i$ for each load could be individually set with low priority loads given a higher cost by the user to achieve this end. The $c_i$ term is user modifiable and can be time-varying such that a user could set each $c_i$ to be very large during periods when they wish to have load curtailment only in rare cases (and for which they will be more highly compensated) or set relatively lower in times when the user may be more tolerant of load curtailment actions.

The parameter η in equation (1) is a value agreed upon by the net-load unit operator (e.g., a homeowner or building manager) and the power aggregator or power system operator. In practice, this process occurs best when, first, the net-load unit operator determines a set of feasible η that it can achieve along with the associated cost of each η. Second, this information is communicated to the system operator who then makes system-level optimal decisions based upon the sets of feasible η and associated costs received from each net-load unit participating within the system operator's net-load coordination group. Finally, the system operator sends chosen η values to each net-load unit for action. This procedure helps ensure that the local net-load unit can implement its own set of objectives and preferences and that a given η is feasible. As an example of an infeasible η, high values of η (i.e., approaching 1.0) would occur if the local net-load unit contained a high capacity of non-deferrable load vs. deferrable loads.

In accordance with the techniques described herein, management device 103 is configured to leverage high-speed measurements from each net-load resource (e.g., obtained via SCCN s 114, 116, and 118) and an algorithmic implementation of control objectives to provide the optimal and coordinated dispatch of resources within a net-load unit for use as primary frequency response. As time is of the essence, management device 103 should be able to communicate to all net-load resources and solve the algorithm associated with the control objective(s) in a rapid (e.g., less than about 10 ac cycles or less than about 200 ms) manner. The techniques of the present disclosure provide a centralized master controller (e.g., management device 103) for coordinated, optimal dispatch of all net-load resources; realize and employ a high-speed communication network (e.g., local network 112) between net-load unit devices and the master controller; provide flexible communication interfaces (SCCNs 114, 116, and 118) to the control layer at each net-load resource; and implement physical interfaces for high-speed measurement and connection/disconnection of electrical loads (e.g., deferrable loads 108).

These techniques were experimentally demonstrated and verified using a residential-scale testbed and one example control objective of minimizing the total load deferred while meeting the frequency response target. However, as previously stated, the techniques are flexible in that it is possible to utilize other load/resource combinations and control objectives. The demonstration was performed using a net-load unit consisting of an inverter and four household appliances in the Energy Systems Integration Facility at the National Renewable Energy Laboratory in Golden, Colo. As the primary aim of the experiment was to demonstrate the performance of the framework and the particular load management algorithm implemented, the four appliances were all considered as deferrable loads and no non-deferrable loads were included. The specific devices used were a 120V combination refrigerator/freezer (General Electric Profile PSQS6YGY); bank of fifteen 120V compact fluorescent and incandescent light bulbs; a 120V plug-in electric heater; a 240V combination Range/Oven (Maytag MER8674); and a 120V, 1 kW ($P_{G,grid}{}^{max}$=1000 W) inverter (custom).

Raspberry Pi 3 ARM-based controllers were used to implement SCCNs 116, and 118 in the demonstration. Given the fact that $P_{G,grid} = \Sigma_i P_{Ld,i} - P_{G,inv}$ for this example demonstration, no Grid PCC Measurement Controller (i.e., SCCN 114) was needed; the total net-load $P_{G,grid}(t)$ was determined using deferrable load and inverter measurements directly. Grid frequency anomaly detection was implemented using a quadrature phase locked-loop (QPLL) implemented on the custom inverter's local controller (as opposed to performed by a PCC SCCN as described elsewhere herein). Reliably measuring frequency during rapid transients and making a control decision within the desired time limit can be challenging. However, this QPLL implementation—with a choice of gains that traded-off overshoot and settling time—provided reliable, settled, measurements within 1-3 AC cycles throughout all rapid transients tested.

The open source ZeroMQ distributed messaging platform was used to implement the control layer, with information being passed between devices using the Transmission Control Protocol (TCP). The implemented SCCNs published measurements and statuses from each net-load resource onto the ZeroMQ message bus and subscribed to requests and commands from Management device 103 on the same message bus. The controller of inverter 106 and inverter SCCN 116 were interfaced using serial communication.

While related-art solutions for controlling loads exist, none were found that natively support on/off control of loads and report high-speed measurements at adequate speed (e.g., less than about 10 ac cycles or less than about 200 ms). Instead, related art solutions are designed for slower speeds and in many cases do not include sensors. Thus, load SCCNs were implemented by custom making physical interfaces for high-speed measurement and connection/disconnection of electrical loads. These deferrable load control interfaces are simple to use by connecting in series with the appliance or load's normal house wiring connection using standard NEMA connectors. Each interface includes a solid state relay; fuses for overcurrent protection; high-bandwidth (~200 kHz) voltage and current sensors; analog RMS-to-dc converters; and a control layer communications interface for processing of measurements and interfacing with the control layer.

Management device 103 needed to be able to communicate to all net-load resources and solve the algorithm associated with the control objective efficiently. In the demonstration, a Raspberry Pi 3 was used to implement the management device, as this met these requirements. However, more powerful local controllers can be leveraged for larger or more complex systems and less powerful controllers could likely be used to achieve lower cost.

The optimization problem described by (2)-(5) was implemented in the management device using Algorithm 1. This algorithm determines the optimal inverter set point $P_{G,inv}^*$ and the optimal set of deferrable loads on/off set points $\{q_{Ld}^*\}_{i=1}^{N_{Ld}}$ that minimize the total amount of load that must be deferred, while achieving the desired grid import power $P_{G,grid}^*(t_e+\tau)$ as closely as possible. Algorithm 1 was designed for use with residential buildings in which deferrable loads are often appliances that can be shut off quickly (using SCCNs), but may not be able to be turned on and a known operating point achieved quickly. Thus, in the demonstration, both deferrable load and inverter generation were used for response to underfrequency events, but only inverter generation was used for response to overfrequency events. In other examples, deferrable loads may be used to respond to both underfrequency and overfrequency events.

Algorithm 1 - Example Net-Load Management Control Implementation

INPUT: $P_{Ld}[1..N_{Ld}]$, $P_{G,inv}$, $P_{G,inv}^{min}$, $P_{G,inv}^{max}$, $P_{G,grid}$, $\eta$, $f(t_e)$, $f_{nom}$
DO:
Calculate $P_{G,grid\Delta} = \eta \, sign(f_{nom} - f(t_e))P_{G,grid}$
//Dynamically build the array of all feasible load actions:
Let $P_{Ldo}[1..N_{Ld}]$ be an array of objects with entries $P_{Ldo}[i].power = P_{Ld}[i]$ and
   $P_{Ldo}[i].idx = i$ for all $i = 1..N_{Ld}$
Let $P_{Ldp}[1..N_{Ldp}]$ be an array of all objects in $P_{Ldo}$ where $P_{Ldo}[i].power > 0$
sort $P_{Ldp}$ in ascending order by $P_{Ldp}[i].power$
Let $P_{La}$ be an empty array //all possible total load set points
$P_{La}[1] = 0$ //corresponds to the case where no loads are curtailed
$P_{La}[2] = P_{Ldp}[1].power$ //case of only the smallest load is curtailed
for $i = 1..(N_{Ldp} - 1)$
   for $j = 1..2^i$
      $P_{La}[2^i + j] = P_{La}[j] + P_{Ldp}[i + 1].power$
      if $P_{La}[2^i + j] > P_{G,grid\Delta}$
         //all feasible load actions needed for this $P_{G,grid\Delta}$ have been added
         break out of both for loops
Let $N_{La} = |P_{La}|$ be the length of $P_{La}$
//first, allocate all available inverter capacity
if $(P_{G,inv}^{max} - P_{G,inv}) \geq P_{G,grid\Delta}$
   $P_{G,inv}^* = P_{G,inv} + P_{G,grid\Delta}$
   $P_{G,grid\Delta} = 0$
else
   $P_{G,inv}^* = P_{G,inv}^{max}$
   $P_{G,grid\Delta} = P_{G,grid\Delta} - P_{G,inv}^*$
//if further reduction required, curtail the minimum total amount of load that achieves the
   required grid power reduction
if $P_{G,grid\Delta} > 0$
   for $i = 1..N_{La}$
      if $(P_{La}[i] \geq P_{G,grid\Delta})$ or $i = N_{La}$
         //build the set of all $q_{Ld,i}^*$ based on the resulting optimal $P_{La}[i]$
         Let $ix[1..N_b]$ be an array with entries corresponding to the $N_b$-bit binary
            representation of $(i - 1)$ with the LSB in $ix[1]$ //e.g., 4 = [0,0,1]
         for $j = 1..N_b$
            $idx_{orig} = P_{Ldp}[j].idx$ //get the index corresponding to load $P_{Ldp}[j]$ in
               the original array
            $q_{Ld}^*[idx_{orig}] = (1 - ix[j])$ //curtail cmd. Format to on/off format
         $P_{G,grid\Delta} = P_{G,grid\Delta} - P_{La}[i]$
         Break
//reduce inverter output by any load curtailment overshoot to
//achieve the minimum deviation from desired grid power
if $P_{G,grid\Delta} < 0$
   $P_{G,inv}^* = P_{G,inv}^* + P_{G,grid\Delta}$
   if $P_{G,inv}^* < P_{G,inv}^{min}$
      $P_{G,inv}^* = P_{G,inv}^{min}$
OUTPUT: $P_{G,inv}^*$, $\{q_{Ld,i}^*\}_{i=1}^{N_{Ld}}$ While omitted for brevity, it can be proved that Algorithm 1 achieves the optimal solution to (2)-(5) when: 1) the net-load unit includes a sufficient amount of deferrable load and inverter-based energy resources; 2) a reasonable $\eta$ is used for the net-load resources available; and 3) an underfrequency event occurs. The implemented algorithm leverages dynamic programming to efficiently and dynamically determine the cost associated with each possible load deferment action from the bottom up. It can be shown that a simple greedy strategy will not work here. Greedy approaches follow a set heuristic, called the greedy choice, for selecting the best choice at each decision point with the intent that this will lead to finding the global optimum. For example, in this problem greedy choices of using all available inverter capacity and then (i) always picking the smallest (and thus lowest cost) load that is below the desired net-load reduction set point, (ii) always picking the absolute smallest load, or (iii) always picking the load that is just above the net-load reduction set point seem like reasonable strategies to follow. However, the three test cases in Table I, below, provide counter-examples for these three amongst other possible greedy choices. In particular, Test Case #1 shows that greedy choices (i) and (ii) do not result in the optimal solution, and Test Cases #2 and #3 show that greedy choice (iii) is also not globally optimal.

As previously described, the control objective implemented was to minimize the total amount of load deferred while providing the desired net-load response. The following test cases examined three scenarios involving the same loads and inverter, but varying net-load response target (varying $\eta$) and actual load measurements. Each test case began with the appliances turned on for some time and the inverter exporting power at ~80% (800 W) of its nominal power rating. A step in grid frequency from 60 Hz to 59.7 Hz was then initiated. The inverter detected the frequency anomaly ($\delta_{f,low}$=0.25 Hz was used). For each test case, the measurements listed in the "Start" column of Table I were received from each resource by the master controller (management device 103). The master controller then determined final load on/off status and inverter set points as shown in the "Finish" column based on the results obtained by executing Algorithm 1.

TABLE I

Input Conditions and Final Results for Test Cases

| | Measured Power (W) at Start and Finish of Case | | | | | |
|---|---|---|---|---|---|---|
| | Test Case #1 ($\eta = 0.09$) | | Test Case #2 ($\eta = 0.14$) | | Test Case #3 ($\eta = 0.17$) | |
| Resource | Start | Finish | Start | Finish | Start | Finish |
| Fridge (I1) | 146 | 146 | 175 | 175 | 147 | 0 |
| Lights (I2) | 411 | 0 | 409 | 0 | 402 | 0 |
| Plug-in Heater (I3) | 1360 | 1360 | 1360 | 1360 | 1345 | 1345 |
| Oven (I4) | 2827 | 2827 | 2850 | 2850 | 2793 | 2793 |
| Inverter | −797 | −742 | −801 | −911 | −802 | −949 |
| Total | 3947 | 3591 | 3993 | 3436 | 3885 | 3227 |
| $\Delta P_{G\_grid}$ | | 9.02% | | 13.95% | | 16.94% |
| Response Time (ms) | | 142.6 | | 141.8 | | 141.9 |

In Test Case #1, 9% (355 W) of the total measured net-load needed to be deferred. This amount was more than the smallest load and the remaining generation capacity of the inverter and so the next largest load (411 W) had to be curtailed. However, once curtailed, constraint (3) determined that the optimal solution should defer as nearly 9% of the net-load as possible. Thus, Algorithm 1 resulted in the inverter's output being reduced.

In Test Case #2, 14% (559 W) of the measured netload was to be curtailed. This required at a minimum that the second largest load (409 W) be curtailed. However, after that load was curtailed the smallest load (175 W) could also have been curtailed but it was not, because the inverter's remaining capacity (200 W) was sufficient to meet the desired set point and the main objective (2) is to minimize the amount of load to be curtailed when possible.

Test Case #3 required a little larger net-load curtailment (17%, 660 W) than Test Case #2. That made the lights curtailment and inverter output increase no longer sufficient to meet the net-load curtailment requirement. Thus, the optimal solution was to curtail both of the two smallest loads and then meet the remaining net-load reduction requirement using an increased inverter output. In all three test cases, the entire sequence of operations, from detection and measurement of a frequency anomaly to completed actuation of coordinated net-load response, was completed within 143 ms (about 8.5 cycles).

Figure 2:
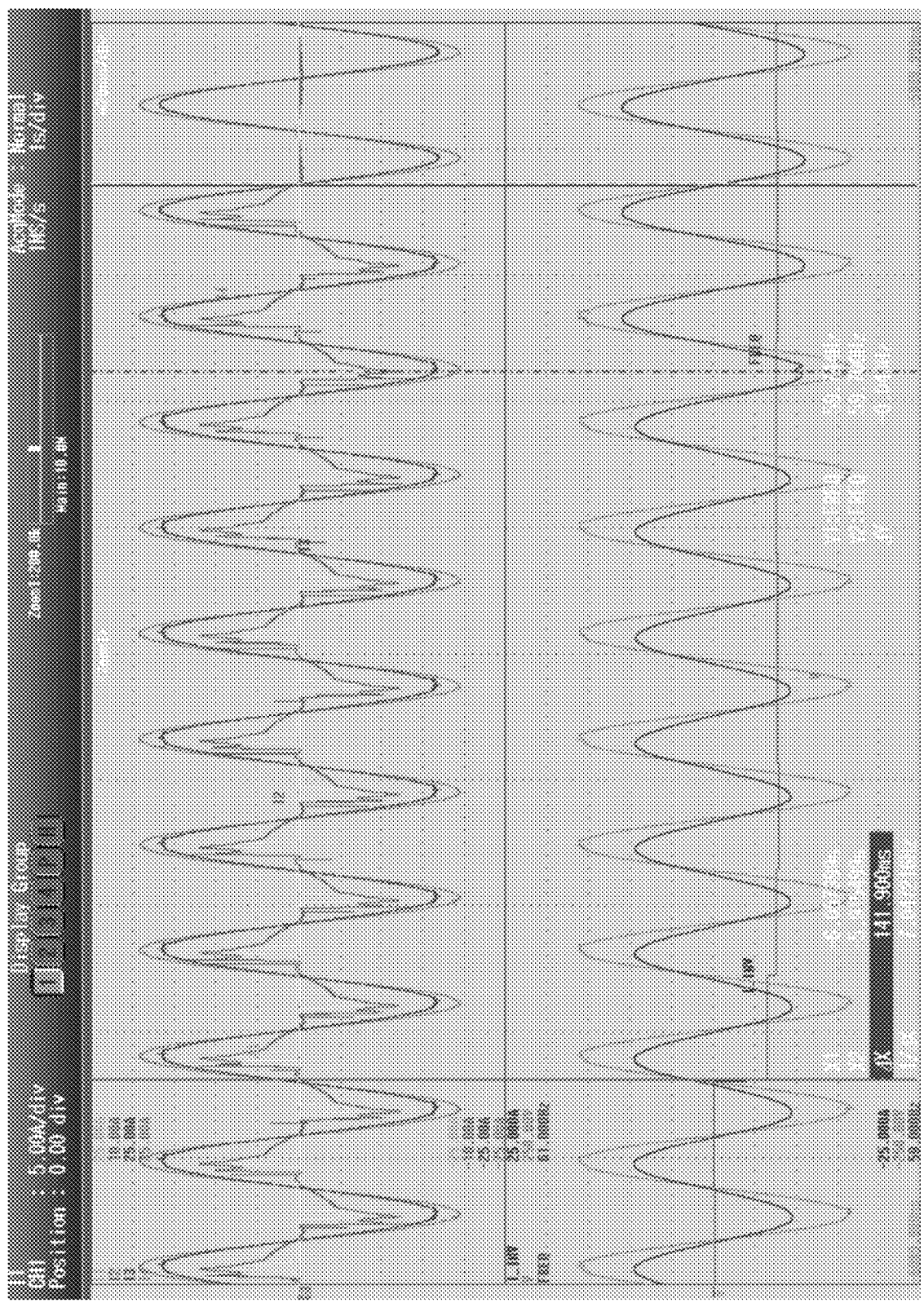
FIG. 2 is a set of graphical plots illustrating experimental performance of coordinated net-load management, in accordance with one or more aspects of the present disclosure.

FIG. 2 is a set of graphical plots illustrating experimental performance of coordinated net-load management, in accordance with one or more aspects of the present disclosure. Specifically, FIG. 2 shows waveform results for Test Case #3. The top plot shows instantaneous current measurements for each deferrable load including a fridge (represented by trace I1 in FIG. 2), a bank of light bulbs (represented by trace I2 in FIG. 2), a plug-in heater represented by trace I3 in FIG. 2), and an oven (represented by trace I4 in FIG. 2). The bottom plot shows the grid voltage (represented by trace V in FIG. 3), calculated grid frequency (represented by trace FREQ in FIG. 2), and inverter current (represented by trace I_INV in FIG. 2). It can be seen that the entire net-load response sequence is completed within 142 ms (~8.5 ac cycles). Thermostatically-controlled loads (e.g., the fridge and oven) and other loads (e.g., the lights and plug-in heater) were purposely included to demonstrate that both types can be leveraged by the disclosed techniques.

Figure 3:
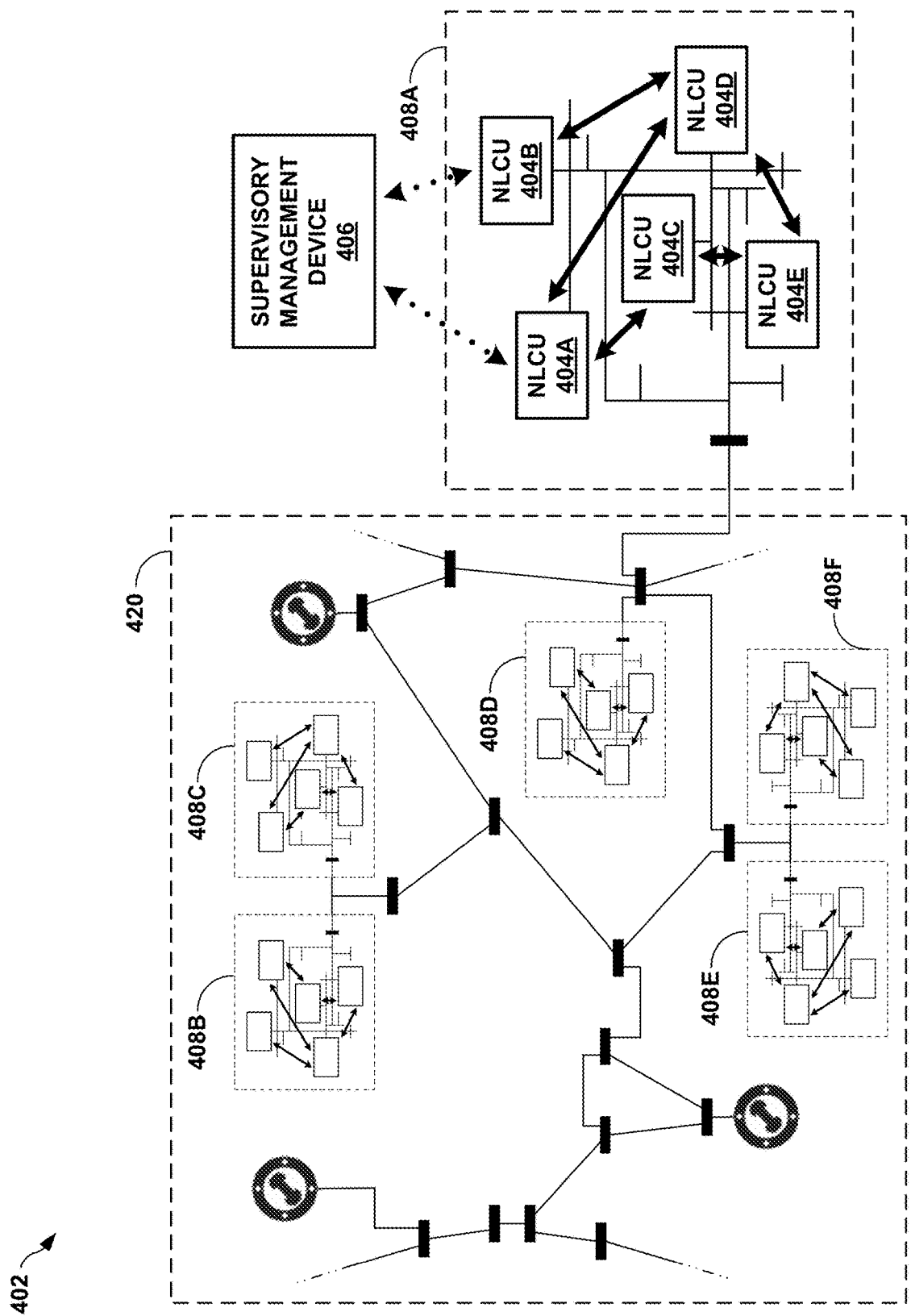
FIG. 3 is a conceptual diagram illustrating an example grid system using coordinated net-load management, in accordance with one or more aspects of the present disclosure.

FIG. 3 is a conceptual diagram illustrating an example grid system (e.g., system 402) using coordinated net-load management, in accordance with one or more aspects of the present disclosure. System 402 represents a broader application of the techniques described herein and achieves coordinated system-wide net-load management for provision of grid primary frequency response using two or more Net-Load Coordination Units or NCLUs. Each NLCU may include one or more inverter-interfaced energy resources, one or more deferrable loads and a management device. For instance, management device 103, energy resources 104, inverter 106, deferrable loads 108, and non-deferrable loads 110 as described with respect to FIG. 1 may represent one example of a NCLU. System 402 includes NLCUs 404A-404E (collectively "NLCUs 404") as part of power distribution system 408A. System 402 also includes larger power system 420. Larger power system 420 includes power distribution systems 408B-408F, which may each include their own collection of NLCUs.

In the example of FIG. 3, system 402 also includes supervisory control device 406. In some examples, however, a supervisory control device 406 may not be included. That is, in some examples system-wide net-load management may utilize only distributed communication and control while in other examples, system-wide net-load management may additionally or alternatively use centralized communication and control. System 402 represents only one example of a grid system using coordinated net-load management, and the techniques described herein may be used in various other systems having more, fewer, or different components than those shown in the example of FIG. 3.

The management device of each of NLCUs 404, as well as the NLCUs in each of power distribution systems 408B-408F, may communicate using wired or wireless means, with its respective set of deferrable loads and controllable generation to implement coordinated net-load management as detailed herein. As previously described, deferrable loads include controllable loads (i.e., those that can be given a continuous value as a load set point command) and non-controllable loads (i.e., those with no capability of receiving or acting upon a load set point). Non-controllable loads are connected to the NLCU's power system through a deferrable load control interface, which provides a means for connecting and disconnecting the non-controllable load, making it dispatchable.

The management devices of the NLCUs 404, as shown in FIG. 3, may communicate using one or both of the following methods: i) distributed communication among one or more of NLCUs 404 and ii) direct communication with supervisory control device 406, if existent.

A coordinated system primary frequency response using multiple NLCUs may consist of two phases. In a pre-event resource identification phase, NLCUs and, if available, a supervisory controller, may communicate periodically with one another to update location, capacities, and constraints of all units and to determine how NLCUs will be grouped together into larger coordinated units, each referred to herein as a Net-load Coordination Group (NLCG), which will respond in a coordinated fashion in the event of a grid frequency anomaly.

NLCG selection may be determined by identifying NLCUs that are close enough (communication latency-wise) to be able to achieve coordinated response on a particular timescale. For instance, if management devices of a number of NLCUs can each communicate with all the others within less than two seconds, less than one second, or some other duration, the management devices may define their NLCUs as a NLCG. The particular timescale for defining a NLCG this way may be locally defined (e.g., by a distribution system manager, by users, or by other entities). NLCGs may be defined in other ways in other examples.

In a coordinated event response phase, when a frequency event occurs, pre-organized NLCGs may each coordinate an optimal grid frequency response using their constituent NLCUs. The management device of each NLCU may gather local operating states and communicate this information to neighboring NLCUs (in the case of no supervisory controller being available) or directly to the supervisory control device (if available). When a supervisory control device is available, it may determine a centralized, optimal, problem solution by gathering state information from all connected NLCUs, solving an optimization problem, and then sending control set points to each NLCU for execution on their associated load and generation devices. When no supervisory controller is connected, a group-wide decision is made using consensus techniques such as ratio-based average consensus or min-max consensus. In either case, individual NLCUs quickly execute set point commands they are given, and the NLCG provides a coordinated grid primary frequency response within about 2 seconds (or less, if defined as a custom value locally). The desired NLCG response time (<=2 seconds) can be set in advance and used to determine the size and capability of each NLCG formed.

In this way, the techniques of the present disclosure may provide primary frequency response across a wider grid and may do so even when individual NLCUs do not have sufficient capacity to make a meaningful difference. By coordinating not only loads and energy resources in each unit, but also groups of units, larger frequency events can be addressed using behind-the-meter resources that would otherwise be unavailable for support. Furthermore, using the techniques described herein, such resources can modify operation fast enough to provide primary response to such frequency events, alleviating some of the responsibility of inertia-based methods. As opposed to autonomous/uncoordinated techniques, the techniques described herein may enable a more coordinated and optimal utilization of behind-the-meter resources for frequency response.

Figure 4:
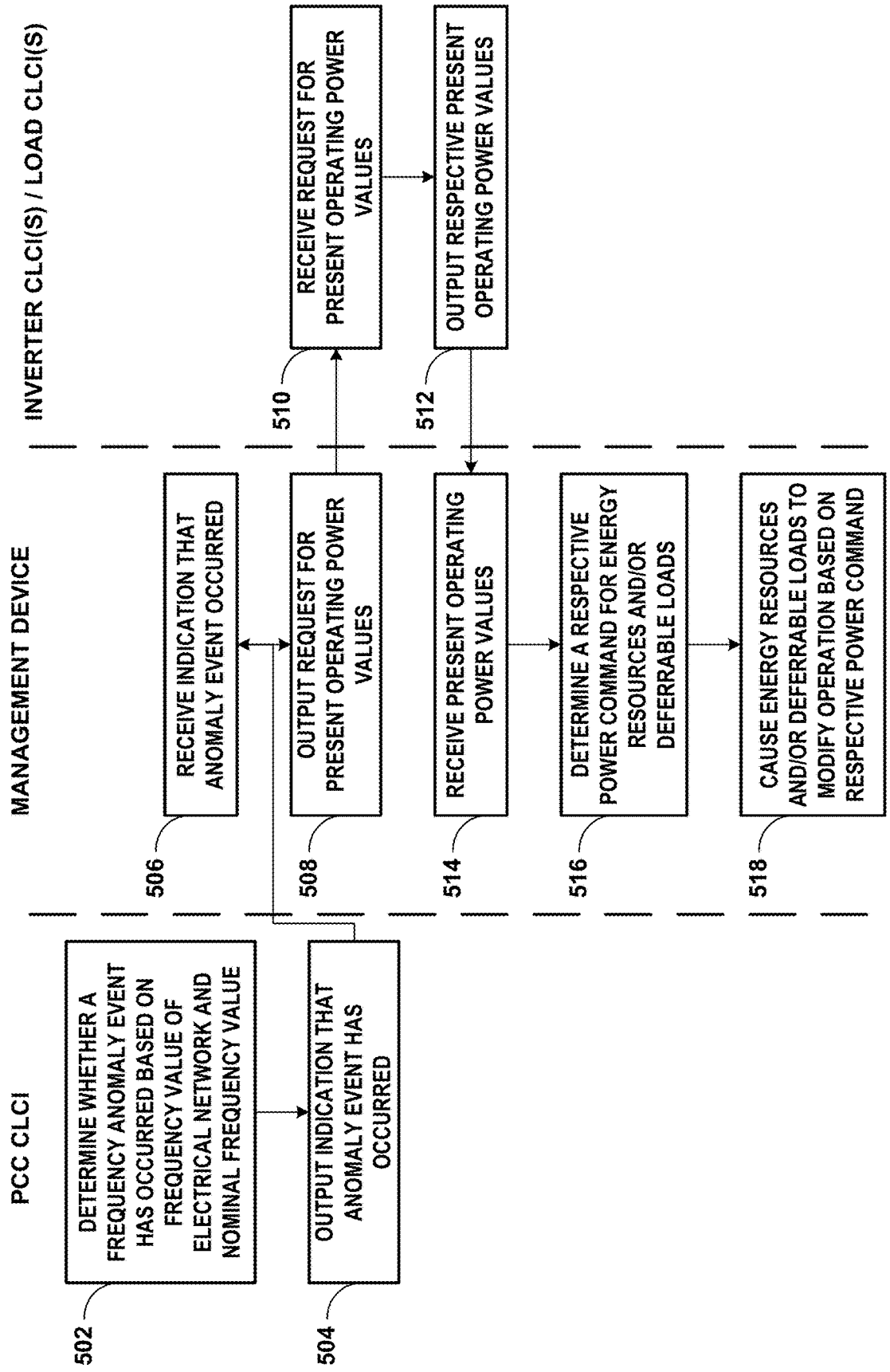
FIG. 4 is a flow diagram illustrating example operations for performing coordinated net-load management, in accordance with one or more aspects of the present disclosure.

FIG. 4 is a flow diagram illustrating example operations for performing coordinated net-load management, in accordance with one or more aspects of the present disclosure. FIG. 4 represents only one example process for performing coordinated net-load management, and various other additional or different operations may be used in other examples. Furthermore, while described in the example of FIG. 4 as being performed by certain devices, some or all operations of FIG. 4 may be performed by different devices than those described. The example operations of FIG. 4 are described below within the context of FIG. 1.

In the example of FIG. 4, a PCC SCCN may determine, based on a frequency value of an electrical network and a nominal frequency value, whether a frequency anomaly event has occurred (502). For instance, PCC SCCN 114 (e.g., containing a measurement unit) may measure $f(t_e)$ and evaluate $f(t) < (f_{nom} - \delta_{f,low})$ and/or $f(t) > (f_{nom} + \delta_{f,high})$ to determine whether an underfrequency event or overfrequency event has occurred. If no frequency event has occurred, PCC SCCN 114 may continue to monitor the grid frequency or perform one or more actions unrelated to the present disclosure. If a frequency anomaly event is detected, the PCC SCCN may output an indication that a frequency anomaly event has occurred (502). For instance, PCC SCCN 114 may output $f(t_e)$ and $P_{G,grid}(t_e)$.

In the example of FIG. 4, a management device may receive an indication that a frequency anomaly event has occurred (506). For instance, management device 103 may receive the grid frequency and grid power measurements. The management device may output a request for present operating power values (508). For instance, management device 103 may output a request for the present operating power value of inverter 106 and each of deferrable loads 108.

In the example of FIG. 4, inverter SCCN(s) and load SCCN(s) may receive the request for present operating power values (510). Responsive to receiving the request, the inverter SCCN(s) and load SCCN(s) may each output an indication of the respective present operating value (512). For instance, inverter SCCN 116 may receive the request, measure $P_{G,inv}$ for inverter 106, and output the latest operating power and operating capacity limits (e.g., $(-P_{G,inv}^{max}, P_{G,inv}^{max})$). Each of load SCCNs 118 may receive the request, measure the latest power consumption of the respective deferrable load, $P_{Ld,i}(t_e)$, and output that value.

In the example of FIG. 4, the management device may receive the present operating power values (514). The management device may determine a respective power command for at least one of the energy resources and/or at least one of the deferrable loads (516). For instance, management device 103 may receive the present operating power values of inverter 106 and deferrable loads 108. Management device 103 may utilize the present operating power values, the grid frequency, the nominal frequency, and the grid power to determine power commands for at least one of inverter 106 and/or deferrable loads 108. As one example, management device 103 may solve optimization problem (2)-(5) to determine $P_{Ld,i}^*$ for each of deferrable loads 108 and $P_{inv}^*$ for inverter 106. As further described herein, Management device 103 may determine power commands based additionally or alternatively on other criteria, including information received from a management device of another net-load unit and/or information received from a supervisory management device.

In the example of FIG. 4, the management device may cause at least one of the energy resources and/or deferrable loads to modify operation based on the respective power command (518). For instance, management device 103 may output dispatch commands to inverter SCCN 116 and/or load SCCNs 118. SCCNs 116 and 118 may receive the commands and modify operating of their respective devices accordingly. For example, inverter SCCN 116 may issue a new power set point to inverter 106 and load SCCNs 118 may cease to provide power to, or modulate power supplied to, deferrable loads 108. The techniques of the present disclosure may be additionally or alternatively described by one or more of the following examples.

Example 1

A device comprising: at least one processor communicatively coupled to at least one energy resource controller that controls at least one energy resource and to at least one deferrable load controller that controls power to at least one deferrable load, wherein the at least one processor is configured to: receive an indication, determined based on a frequency value of an electrical network and a nominal frequency value, that a frequency anomaly event has occurred; and responsive to receiving the indication that the frequency anomaly event has occurred: determine, for at least one of the at least one energy resource and the at least one deferrable load, based on the frequency value, the nominal frequency value, and a power value of the electrical network, a respective power command; and cause at least one of the at least one energy resource and the at least one deferrable load to modify operation based on the respective power command.

Example 2

The device of example 1, wherein determining the respective power command comprises: outputting a request for a respective present operating power value from each of the at least one energy resource and the at least one deferrable load; receiving an indication of the respective present operating power value for each of the at least one energy resource and the at least one deferrable load; and determining the respective power command based additionally on the respective present operating power value for each of the at least one energy resource and the at least one deferrable load.

Example 3

The device of any of examples 1-2, wherein the respective power command is determined based additionally on a specified control objective.

Example 4

The device of example 3, wherein the specified control objective comprises at least one of: minimizing a total amount of deferrable load that must be curtailed; or prioritizing unmodified operation of specific ones of the at least one deferrable load.

Example 5

The device of any of examples 1-4, wherein the frequency anomaly event comprises an underfrequency event in which the frequency value is smaller than the nominal frequency value less a nominal frequency limit value; determining the respective power command comprises: determining, based on a present power value of the electrical network, the frequency value and the nominal frequency value, a necessary power delta value; and determining whether the necessary power delta value is larger than a difference between a maximum rated power output value for the at least one energy resource and a present power output value for the at least one energy resource; and causing at least one of the at least one energy resource and the at least one deferrable load to modify operation comprises causing, responsive to determining that the necessary power delta value is not larger than the difference, the at least one energy resource controller to increase a power output of the at least one energy resource by the necessary power delta value.

Example 6

The device of example 5, wherein: the at least one deferrable load comprises a plurality of deferrable loads, each corresponding to a respective present load value in a plurality of present load values; determining the respective power command further comprises, responsive to determining that the necessary power delta value is larger than the difference, determining, based on the plurality of present load values, a set of deferrable loads in the plurality of deferrable loads that will be curtailed; and causing at least one of the at least one energy resource and the at least one deferrable load to modify operation comprises causing, responsive to determining the set of deferrable loads, a respective deferrable load controller for each deferrable load in the set of deferrable loads to cease providing power to the deferrable load.

Example 7

The device of any of examples 1-6, wherein: the at least one processor is communicatively coupled to a second instance of the device; and the respective power command is determined based additionally on information received from the second instance of the device regarding a net-load unit managed by the second instance of the device.

Example 8

The device of any of examples 1-7, wherein causing the at least one of the at least one energy resource and the at least one deferrable load to modify operation based on the respective power command comprises outputting, to the at least one deferrable load controller, instructions to cease providing power to the at least one deferrable load.

Example 9

The device of any of examples 1-8, wherein causing the at least one of the at least one energy resource and the at least one deferrable load to modify operation based on the respective power command comprises outputting, to the at least one energy resource controller, instructions to modify an operating set point of the at least one energy resource.

Example 10

The device of any of examples 1-9, wherein the at least one processor is configured to cause the at least one of the at least one energy resource and the at least one deferrable load to modify operation within 200 ms after receiving the indication.

Example 11

A system comprising: a grid point of common coupling (PCC) controller configured to: measure a frequency value of an electrical distribution network at a point at which the electrical distribution network connects to a consumer electrical system; determine, based on the frequency value and a nominal frequency value, whether a frequency anomaly event has occurred; and responsive to determining that the frequency anomaly event has occurred, output an indication of the frequency anomaly event; a net-load management device comprising at least one processor, wherein the net-load management device is configured to: receive the indication of the frequency anomaly event; output a request for a respective present operating power value for at least one deferrable load in the consumer electrical system; receive an indication of the respective present operating value for the at least one deferrable load; responsive to receiving the indication of the frequency anomaly event, determine, for the at least one deferrable load, based on the respective present operating value, the frequency value, and a nominal frequency value, a respective power command; and output an indication of the respective power command; and at least one deferrable load controller operatively coupled to the at least one deferrable load, the at least one deferrable load controller configured to: receive the indication of the respective power command; and cause the at least one deferrable load to modify operation based on the respective power command.

Example 12

The system of example 11, wherein: the net-load management device is further configured to: output a request for a respective present operating power value for at least one energy resource in the consumer electrical system; and receive an indication of the respective present operating value for the at least one energy resource; determining, the respective power command comprises determining a respective power command for at least one of the at least one energy resource and the at least one deferrable load; and the system further comprises at least one energy resource controller operatively coupled to the at least one energy resource, the at least one energy resource controller configured to: receive the indication of the respective power command; and issue a set point to the at least one energy resource based on the respective power command.

Example 13

The system of example 12, wherein: the frequency anomaly event comprises an underfrequency event in which the frequency value is smaller than the nominal frequency value less a nominal frequency limit value; determining the respective power command comprises: determining, based on a present power value of the power distribution network, the frequency value and the nominal frequency value, a necessary power delta value; and determining whether the necessary power delta value is larger than a difference between a maximum rated power output value for the at least one energy resource and a present power output value for the at least one energy resource; and outputting the indication of the respective power command comprises outputting, responsive to determining that the necessary power delta value is not larger than the difference, an instruction to cause the at least one energy resource controller to increase a power output of the at least one energy resource by the necessary power delta value.

Example 14

The system of example 13, wherein: the at least one deferrable load comprises a plurality of deferrable loads, each corresponding to a respective present load value in a plurality of present load values; determining the respective power command further comprises, responsive to determining that the necessary power delta value is larger than the difference, determining, based on the plurality of present load values, a set of deferrable loads in the plurality of deferrable loads that will be curtailed; and outputting the indication of the respective power command comprises outputting, responsive to determining the set of deferrable loads, instructions to a respective deferrable load controller for each deferrable load in the set of deferrable loads to cease providing power to the deferrable load.

Example 15

The system of any of examples 11-14, wherein: the grid PCC, the net-load management device, and the at least one deferrable load are part of a first net-load unit; the net-load management device is a first net-load management device; the first net-load management device is further configured to receive second net-load information about at least one of an energy resource included in a second net-load unit or a deferrable load included in the second net-load unit; and the first net-load management device is configured to determine the respective power command based additionally on the second net-load information.

Example 16

The system of example 15, wherein the first net-load management device is further configured to output, to at least one of a supervisory management device or a second net-load management device that manages the second net-load unit, an indication of the respective present operating value for the at least one deferrable load.

Example 17

The system of any of examples 11-16, wherein the net-load management device is configured to determine the respective power command based additionally on a specified control objective that comprises at least one of: minimizing a total amount of deferrable load that must be curtailed; or prioritizing unmodified operation of specific ones of the at least one deferrable load.

Example 18

The system of any of examples 11-17, wherein the at least one deferrable load controller is configured to cause the at least one deferrable load to modify operation by outputting, to the at least one deferrable load, instructions to modify an operating set point of the at least one deferrable load.

Example 19

The system of any of examples 11-18, wherein the at least one deferrable load controller is configured to cause the at least one deferrable load to modify operation by ceasing to provide power to the deferrable load.

Example 20

A method comprising: receiving, by a computing device comprising at least one processor, an indication, determined based on a frequency value of an electrical network and a nominal frequency value, that a frequency anomaly event has occurred, wherein the computing device is communicatively coupled to at least one energy resource controller that controls at least one energy resource and to at least one deferrable load controller that controls power to at least one deferrable load; and responsive to receiving the indication that the frequency anomaly event has occurred: determining, by the computing device and for at least one of the at least one energy resource and the at least one deferrable load, based on the frequency value, the nominal frequency value, and a power value of the electrical network, a respective power command; and causing, by the computing device, at least one of the at least one energy resource and the at least one deferrable load to modify operation based on the respective power command.

The techniques of the present disclosure provide a framework for provision of fast primary frequency response using coordinated deferrable loads and energy resources such as DERs. This approach has the unique aspect of providing a fast response appropriate for primary frequency control but doing so using a group of net-load resources that is coordinated in real-time in order to maximize local objectives. The techniques disclosed herein are flexible such that a variety of deferrable load and energy resource devices can be controlled using configurable SCCNs and such that a variety of objectives for the optimal net-load management scheme can be defined. The use of this approach in aggregation may enable wide-spread flexible load and DERs to provide significant grid ancillary services that will help stabilize the emerging low-inertia grid.

In one or more examples, the techniques described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

What is claimed is:

1. A device comprising:
at least one processor communicatively coupled to at least one energy resource controller that controls at least one energy resource and to at least one deferrable load controller that controls power to at least one deferrable load, wherein the at least one processor is configured to:
receive an indication, determined based on a frequency value of an electrical network and a nominal frequency value, that a frequency anomaly event has occurred; and
responsive to receiving the indication that the frequency anomaly event has occurred:
determine, for at least one of the at least one energy resource and the at least one deferrable load, based on the frequency value, the nominal frequency value, and a power value of the electrical network, a respective power command; and
cause at least one of the at least one energy resource and the at least one deferrable load to modify operation based on the respective power command.

2. The device of claim 1, wherein determining the respective power command comprises:
outputting a request for a respective present operating power value from each of the at least one energy resource and the at least one deferrable load;
receiving an indication of the respective present operating power value for each of the at least one energy resource and the at least one deferrable load; and
determining the respective power command based additionally on the respective present operating power value for each of the at least one energy resource and the at least one deferrable load.

3. The device of claim 1, wherein the respective power command is determined based additionally on a specified control objective.

4. The device of claim 3, wherein the specified control objective comprises at least one of:
minimizing a total amount of deferrable load that must be curtailed; or
prioritizing unmodified operation of specific ones of the at least one deferrable load.

5. The device of claim 1, wherein:
the frequency anomaly event comprises an underfrequency event in which the frequency value is smaller than the nominal frequency value less a nominal frequency limit value;
determining the respective power command comprises:
determining, based on a present power value of the electrical network, the frequency value and the nominal frequency value, a necessary power delta value; and
determining whether the necessary power delta value is larger than a difference between a maximum rated power output value for the at least one energy resource and a present power output value for the at least one energy resource; and
causing at least one of the at least one energy resource and the at least one deferrable load to modify operation comprises causing, responsive to determining that the necessary power delta value is not larger than the difference, the at least one energy resource controller to increase a power output of the at least one energy resource by the necessary power delta value.

6. The device of claim 5, wherein:
the at least one deferrable load comprises a plurality of deferrable loads, each corresponding to a respective present load value in a plurality of present load values;
determining the respective power command further comprises, responsive to determining that the necessary power delta value is larger than the difference, determining, based on the plurality of present load values, a set of deferrable loads in the plurality of deferrable loads that will be curtailed; and
causing at least one of the at least one energy resource and the at least one deferrable load to modify operation comprises causing, responsive to determining the set of deferrable loads, a respective deferrable load controller for each deferrable load in the set of deferrable loads to cease providing power to the deferrable load.

7. The device of claim 1, wherein:
the at least one processor is communicatively coupled to a second instance of the device; and
the respective power command is determined based additionally on information received from the second instance of the device regarding a net-load unit managed by the second instance of the device.

8. The device of claim 1, wherein causing the at least one of the at least one energy resource and the at least one deferrable load to modify operation based on the respective power command comprises outputting, to the at least one deferrable load controller, instructions to cease providing power to the at least one deferrable load.

9. The device of claim 1, wherein causing the at least one of the at least one energy resource and the at least one deferrable load to modify operation based on the respective power command comprises outputting, to the at least one energy resource controller, instructions to modify an operating set point of the at least one energy resource.

10. The device of claim 1, wherein the at least one processor is configured to cause the at least one of the at least one energy resource and the at least one deferrable load to modify operation within 200 ms after receiving the indication.

11. A system comprising:
a grid point of common coupling (PCC) controller configured to:
measure a frequency value of an electrical distribution network at a point at which the electrical distribution network connects to a consumer electrical system;
determine, based on the frequency value and a nominal frequency value, whether a frequency anomaly event has occurred; and
responsive to determining that the frequency anomaly event has occurred, output an indication of the frequency anomaly event;
a net-load management device comprising at least one processor, wherein the net-load management device is configured to:
receive the indication of the frequency anomaly event;
output a request for a respective present operating power value for at least one deferrable load in the consumer electrical system;
receive an indication of the respective present operating value for the at least one deferrable load;
responsive to receiving the indication of the frequency anomaly event, determine, for the at least one deferrable load, based on the respective present operating value, the frequency value, and a nominal frequency value, a respective power command; and
output an indication of the respective power command; and
at least one deferrable load controller operatively coupled to the at least one deferrable load, the at least one deferrable load controller configured to:
receive the indication of the respective power command; and
cause the at least one deferrable load to modify operation based on the respective power command.

12. The system of claim 11, wherein:
the net-load management device is further configured to:
output a request for the respective present operating power value for at least one energy resource in the consumer electrical system; and
receive an indication of the respective present operating value for the at least one energy resource;
determining, the respective power command comprises determining a respective power command for at least one of the at least one energy resource and the at least one deferrable load; and
the system further comprises at least one energy resource controller operatively coupled to the at least one energy resource, the at least one energy resource controller configured to:
receive the indication of the respective power command; and
issue a set point to the at least one energy resource based on the respective power command.

13. The system of claim 12, wherein:
the frequency anomaly event comprises an underfrequency event in which the frequency value is smaller than the nominal frequency value less a nominal frequency limit value;
determining the respective power command comprises:
determining, based on a present power value of the power distribution network, the frequency value and the nominal frequency value, a necessary power delta value; and
determining whether the necessary power delta value is larger than a difference between a maximum rated power output value for the at least one energy resource and a present power output value for the at least one energy resource; and outputting the indication of the respective power command comprises outputting, responsive to determining that the necessary power delta value is not larger than the difference, an instruction to cause the at least one energy resource controller to increase a power output of the at least one energy resource by the necessary power delta value.

14. The system of claim 13, wherein:
the at least one deferrable load comprises a plurality of deferrable loads, each corresponding to a respective present load value in a plurality of present load values;
determining the respective power command further comprises, responsive to determining that the necessary power delta value is larger than the difference, determining, based on the plurality of present load values, a set of deferrable loads in the plurality of deferrable loads that will be curtailed; and
outputting the indication of the respective power command comprises outputting, responsive to determining the set of deferrable loads, instructions to a respective deferrable load controller for each deferrable load in the set of deferrable loads to cease providing power to the deferrable load.

15. The system of claim 11, wherein:
the grid PCC, the net-load management device, and the at least one deferrable load are part of a first net-load unit;
the net-load management device is a first net-load management device;
the first net-load management device is further configured to receive second net-load information about at least one of an energy resource included in a second net-load unit or a deferrable load included in the second net-load unit; and
the first net-load management device is configured to determine the respective power command based additionally on the second net-load information.

16. The system of claim 15, wherein the first net-load management device is further configured to output, to at least one of a supervisory management device or a second net-load management device that manages the second net-load unit, an indication of the respective present operating value for the at least one deferrable load.

17. The system of claim 11, wherein the net-load management device is configured to determine the respective power command based additionally on a specified control objective that comprises at least one of:
minimizing a total amount of deferrable load that must be curtailed; or
prioritizing unmodified operation of specific ones of the at least one deferrable load.

18. The system of claim 11, wherein the at least one deferrable load controller is configured to cause the at least one deferrable load to modify operation by outputting, to the at least one deferrable load, instructions to modify an operating set point of the at least one deferrable load.

19. The system of claim 11, wherein the at least one deferrable load controller is configured to cause the at least one deferrable load to modify operation by ceasing to provide power to the deferrable load.

20. A method comprising:
receiving, by a computing device comprising at least one processor, an indication, determined based on a frequency value of an electrical network and a nominal frequency value, that a frequency anomaly event has occurred, wherein the computing device is communicatively coupled to at least one energy resource controller that controls at least one energy resource and to at least one deferrable load controller that controls power to at least one deferrable load; and
responsive to receiving the indication that the frequency anomaly event has occurred:
determining, by the computing device and for at least one of the at least one energy resource and the at least one deferrable load, based on the frequency value, the nominal frequency value, and a power value of the electrical network, a respective power command; and
causing, by the computing device, at least one of the at least one energy resource and the at least one deferrable load to modify operation based on the respective power command.

* * * * *